March 13, 1956  J. R. COX  2,738,198
PUSHERS FOR POLYGON-SHAPED STOCK
Filed July 24, 1953

INVENTOR.
JOHN R. COX
BY

United States Patent Office 2,738,198
Patented Mar. 13, 1956

2,738,198

PUSHERS FOR POLYGON-SHAPED STOCK

John R. Cox, Cleveland, Ohio

Application July 24, 1953, Serial No. 370,177

5 Claims. (Cl. 279—41)

My invention relates to pushers or feeders for advancing stock in a machine tool, such as an automatic screw machine.

In the following discussion, the word "polygon" is used in its broadest sense so as to include any figure or geometric form having more than two angles and two sides. Included are three-sided figures, four-sided figures, five-sided figures, and other sided figures, as well as the hexagon figure or shape illustrated in the accompanying drawing.

An object of my invention is to provide in a pusher guide means for aligning and registering polygon-shaped stock in the polygon-shaped bore of a pusher.

Another object is the provision of guiding cam surfaces in a pusher for aiding in the proper positioning of stock so as to fit into the complementary polygon-shaped bore of a pusher.

Another object is the provisions of notches or recesses arranged in a pusher in a manner as to provide a guide through the sense of feeling in the initial feeding of polygon-shaped bar stock into the pusher.

A further object is the provision of a construction in a pusher aiding the ready and facile positioning of polygon-shaped stock in the complementary polygon-shaped bore of the pusher.

Still another object is the provision of a means for obtaining results and producing advantages not heretofore obtainable.

Other objects and a fuller understanding of the invention may be had by referring to the following description and claims, taken in conjunction with the accompanying drawing, in which:

Figure 1:
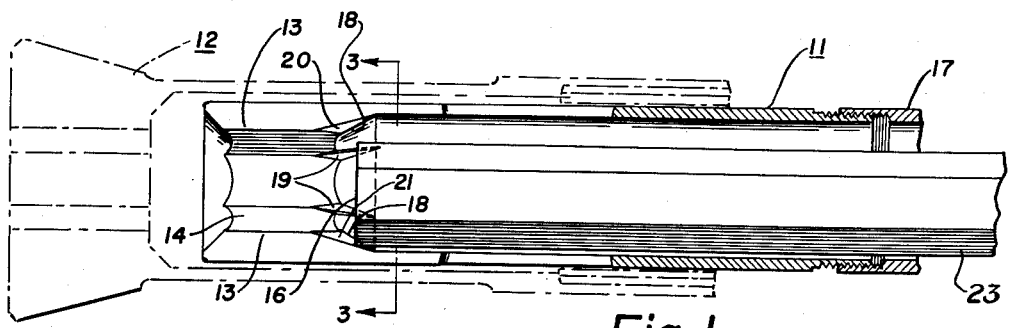
Figure 1 is a longitudinal, cross-sectional view of a pusher embodying my invention.

In the initial feeding of a long bar of stock of polygon shape, such as the hexagon shape of the stock shown in the drawing, there is encountered, in the absence of my invention, some difficulty in aligning and registering the stock with the polygonal shaped bore of the pusher, which complements and closely engages the stock at the forward end of the pusher. The person advancing the bar stock from the rearward end of the pusher has considerable difficulty in rotating the bar stock and in actually aligning the bar stock so that the forward end of the bar stock accurately enters into the polygonal shaped bore of the pusher at its forward end. By the nature of the function of the pusher, the bore of the pusher at its forward end closely interfits and complements the polygonal shaped stock and this fact makes alignment and registration difficult. I have provided means which makes this alignment and registration more quickly and efficiently accomplished upon advancing the bar stock into the pusher.

In this description, the forward end of the pusher is shown as having an approximate hexagon bore and the stock as having a hexagon shape in cross-section. Because of the compression of the forward end of the pusher, the bore is slightly less than a true hexagon in one direction, but for purposes of simplicity, this bore is referred to as being of polygon shape, in this case of hexagon shape, because after the stock is inserted into the bore, then the bore is of polygonal shape, in this case hexagon shape.

In the drawing, the pusher is denoted generally by the reference character 11. This pusher is shown mounted within a collet indicated in broken lines and denoted generally by the reference character 12. The pusher has within it at its forward end, six pad portions 13 which are for the purpose of seizing and holding stock being fed by the pusher to the collet. In the illustration, the pad portions 13 are integral with the pusher 11, although in other embodiments, the pads 13 may be separate from the walls of the pusher and may be readily removed from or inserted within the walls of the pusher in a manner generally known. The disposition of the pad portions 13 is such that they define a hexagon shaped bore denoted by the reference character 14.

A length or piece of bar stock 23 has a cross-section of polygonal shape. The stock 23 is advanced into the pusher from its rearward end in the well-known manner. The rearward end of the pusher 11 is threadably mounted to a hollow supporting member 17, which carries the pusher on the machine.

The rearward and major portion of the length of the pusher 11 has a round or annular bore 22 surrounded by the cylindrical shaped wall of the pusher. The round bore 22 is considerably larger in diameter than the maximum diameter of the stock 23 so that there is little difficulty in inserting the stock 23 into the bore 22 and moving the stock forwardly through the round bore 22.

The pusher is split lengthwise by the two elongated slots 15. The pusher, being heat-treated, is thus provided with resilient fingers so biased as to compress the two fingers together and thus to grasp and hold stock within the polygonal shaped bore 14. Of course, other forms of slits may be provided so as to provide more than two fingers, if desired.

Intermediate the round bore 22 and the polygonal shaped bore 14, there is a sloping intermediate wall or ledge 18. This wall 18 extends forwardly and radially from the inner wall of the bore 22 to where it meets the inner wall of the bore 14. This ledge or intermediate wall would ordinarily form an obstruction or barrier to the stock 23 as the forward end 16 of the stock 23 encounters the intermediate wall or ledge 18. Unless the stock is accurately aligned with the polygonal shaped bore 14 and its hexagon cross-section turned so that the corresponding hexagon shapes are in accurate registration, there is difficulty in advancing the forward end 16 of the stock 23 into the complementary bore 14.

To provide guiding and camming surfaces, I provide a plurality of notches or recesses 19 in the wall or ledge 18 at positions in alignment with the corners of the hexagon-shaped bore 14. As there are six inner corners of the bore 14, there are correspondingly six notches or recesses 19 in the intermediate wall or ledge 18. Each notch 19 has two walls or sides 20 and 21, respectively, which are inclined toward each other and also toward the inner corner of the hexagon-shaped bore 14. In other words, the line of intersection of each notch or recess 19 and the sloping wall 18 converge rearwardly of the pusher, and the lines of intersection of each notch or recess 19 and the inner wall of the pad portions 13 (defining the bore 14) converge forwardly of the pusher. The surface of each wall 20 and 21, which together define a notch 19, has a form in the approximate shape of a triangle, the bases of the triangles being disposed to converge with the bore 14. Thus, the walls 20 and 21 of each notch slope toward each other and also toward the bore 14. These pairs of walls 20 and 21 of the notch 19 act as camming surfaces which will turn the outer corner of the stock 23 at its forward end 16 upon such outer corner of the stock engaging one of the walls 20 or 21. If an outer corner of the stock 23 is not positioned to engage one of the walls 20 or 21, it may be rotated by the hand of the person advancing the stock into the pusher until the person feels the outer corner of the stock engaging in one of the notches 19. The notches 19 having the sloping walls 20 and 21, thus act to guide, through the sense of feeling, the operator as he pushes stock into the pusher and rotates it in an attempt to register the stock with the bore 14.

Figure 3:
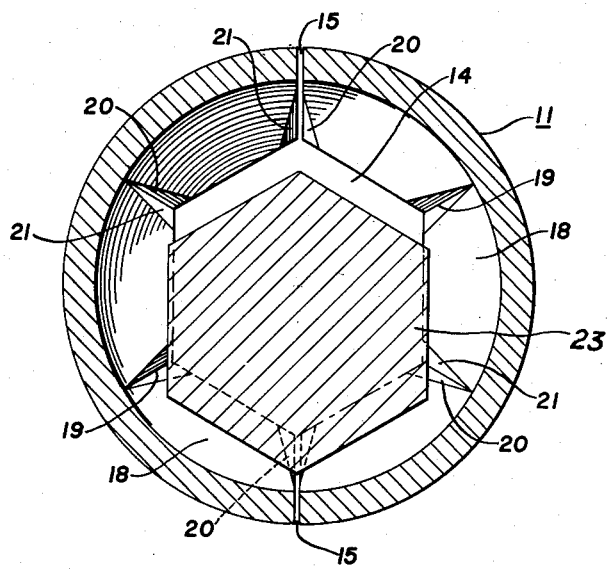
Figure 3 is an enlarged, cross-sectional view taken through the line 3—3 of Figure 1.

It is also difficult to align the stock 23 with the bore 14 as the forward end 16 tends either to droop down to the position shown in Figures 1 and 3 or to be raised upwardly at an opposite inclination. The problem therefore is that the forward end 16 of the stock 23 encounters the barrier formed by the intermediate ledge or wall 18. Without the notches 19, the axial alignment of the stock with the bore 14 is difficult, as is also the turning of the stock to the proper position so as to register with the bore 14. It is thus seen that by my invention, the operator feeding a fresh piece of stock 23 into the pusher is provided with a convenient and sure way of guiding the stock 23 in alignment and in registration with the bore of the pusher at its forward end which complements the shape of the stock. In Figures 1 and 3, the stock is illustrated as having been turned by hand by sense of feel through the guidance provided by the walls of the notches 19. Upon forward movement of the stock 23 into the pusher, the stock rides upon or is cammed up into the bore 14 by the sloping walls 20 and 21 of the notch 19 encountered by the stock.

Figure 4:
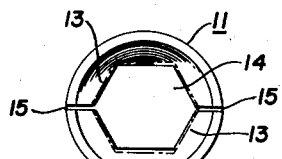
Figure 4 is an endwise view looking in the direction of arrows 4—4 of Figure 2.
Figure 2:
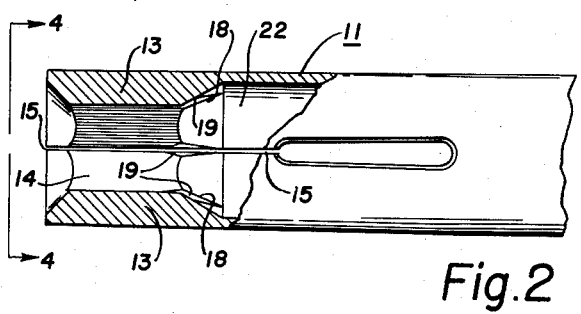
Figure 2 illustrates the forward end of the pusher shown in Figure 1, partly in section and in which the pusher has been rotated ninety degrees from the position illustrated in Figure 1.

The problem of feeding the stock into the bore is further complicated and made difficult by the fact that the bore is not quite truly complementary to the shape of the stock when the closed fingers of the pusher are in compressed position, such as shown in Figure 4. In Figure 4, the bore 14, when the pusher is in its compressed position and not holding a piece of stock, is shown in full lines. However, after the fingers have been expanded by the insertion of the hexagon stock, the bore 14 assumes the outline shown in broken lines in Figure 4. This difference in the shape of the bore 14 in its expanded condition and in its compressed condition makes the fitting of the stock into the bore 14 additionally difficult without my invention. However, with my invention, the forward end of the stock is readily guided into the proper position so as to force apart the fingers of the pusher as the stock is advanced. Those familiar with the problems of feeding stock into pushers will readily appreciate and recognize the many benefits and advantages obtainable with my invention, those above described as well as those inherent in the construction.

This disclosure includes the disclosure contained in the appended claims as well as that contained in the foregoing description and the drawing.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A pusher having stock-engaging portions adjacent its forward end, said portions defining a polygon-shaped bore for accommodating complementary polygon-shaped stock advanced by the pusher, said polygon-shaped bore having axially extending corners adapted to complementarily fit the angular surfaces of said stock, said pusher having another bore rearwardly of and aligned with said polygon-shaped bore, said pusher having a sloping ledge portion extending between said another bore and said polygon-shaped bore, said sloping ledge portion facing said another bore and engageable by said stock fed through said another bore from the rear of the pusher, said sloping ledge portion having recesses formed therein at the rearward ends of said corners, respectively, each said recess having sides inclined toward each other and toward a respective corner to provide camming surfaces engageable by said stock fed through said another bore against said inclined ledge portion, the lines of intersection of each said recess and the inclined ledge portion converging rearwardly of the pusher and the lines of intersection of each said recess and the wall of said polygon-shaped bore converging forwardly of the pusher, said camming surfaces providing a guide for feeding said stock into said polygon-shaped bore in complementary arrangement.

2. A pusher for feeding stock of polygon-shaped cross-section into a machine, said pusher having adjacent its forward end a polygon-shaped bore complementarily sized and shaped to receive said stock in close fit, said pusher having facing said polygon-shaped bore a plurality of stock-engaging portions adapted to engage said stock fed by the pusher, said stock-engaging portions defining inner corners adapted to accommodate and interfit with the said stock, said pusher having adjacent its rearward end a round bore having a diameter greater than the maximum diameter of said polygon-shaped bore and through which stock is advanced from the rear of the pusher to said polygon-shaped bore, said pusher having an intermediate bore joining said round bore and said polygon-shaped bore, said intermediate bore having a sloping wall gradually decreasing in diameter from said round bore to said polygon-shaped bore, said sloping wall being engageable by stock advanced through said round bore toward the polygon-shaped bore, said sloping wall having a plurality of depressions formed therein, each depression being in axial alignment with a said inner corner, respectively, of the polygon-shaped bore, the lines of intersection of each said depression and said sloping wall converging rearwardly of the pusher and the lines of intersection of each said depression and the wall of said polygon-shaped bore converging forwardly of the pusher, the sides of each depression merging toward the respective inner corner to provide guiding surfaces for said stock advanced through the round bore toward the polygon-shaped bore for the facile positioning of the stock in complementary arrangement within the polygon-shaped bore.

3. In a pusher having angularly disposed pad portions arranged to accommodate therebetween stock having angularly disposed sides of complementary shape and size, said pad portions having opposed wall surfaces facing inwardly to engage said stock, said pusher having an internal wall disposed radially of said pusher and extending rearwardly from the said wall surfaces of said pad portions, said internal wall being engageable by the end of said stock as the stock is advanced through the rear of the pusher to between said pad portions in the absence of true axial alignment and accurate registration of the stock and the pusher, the improvement of a plurality of notches in said pusher extending rearwardly from said internal wall, the lines of intersection of each said notch and said internal wall converging rearwardly of the pusher and the lines of intersection of each said notch and said wall surfaces of the pad portions converging forwardly of the pusher, each notch having sides extending forwardly and radially to merge with the said angularly disposed pad portions at the region of the angles therebetween and also gradually extending away from each other in a rearward direction, the sides of the respective notches upon being engaged by the end of said stock providing surfaces for guiding the stock into true axial alignment and accurate registration with the pusher upon being moved between said pad portions.

4. In a pusher having angularly disposed pad portions arranged to accommodate therebetween stock having angularly disposed sides of complementary shape and size, said pad portions having opposed wall surfaces facing inwardly to engage said stock, said pusher having an internal wall disposed radially of said pusher and extending rearwardly from the said wall surfaces of said pad portions, said internal wall being engageable by the end of said stock as the stock is advanced through the rear of the pusher to between said pad portions in the absence of true axial alignment and accurate registration of the stock and the pusher, the improvement of a plurality of notches in said internal wall, each notch having sloping walls inclined toward each other and toward the forward end of the pusher, said sloping walls merging with the said wall surface of said pad portions on the opposite sides of the respective angles therebetween, the lines of intersection of each said notch and said internal wall converging rearwardly of the pusher and the lines of intersection of each said notch and said wall surfaces of the pad portions converging forwardly of the pusher, said sloping walls of the respective notches upon being engaged by the end of said stock providing means for guiding said stock into axial alignment and into registration with said pusher.

5. In a pusher having angularly disposed pad portions arranged to accommodate therebetween stock having angularly disposed sides of complementary shape and size, said pad portions having opposed wall surfaces facing inwardly to engage said stock, said pusher having an internal wall disposed radially of said pusher and extending rearwardly from the said wall surfaces of said pad portions, said internal wall being engageable by the end of said stock as the stock is advanced through the rear of the pusher to between said pad portions in the absence of true axial alignment and accurate registration of the stock and the pusher, the improvement of a plurality of notches in said internal wall, each notch having sloping walls inclined toward each other and toward the forward end of the pusher, said sloping walls merging with the said wall surfaces of said pad portions on the opposite sides of the respective angles therebetween, the lines of intersection of each said notch and said internal wall converging rearwardly of the pusher and the lines of intersection of each said notch and said wall surfaces of the pad portions converging forwardly of the pusher, the sloping walls of the respective notches upon being engaged by said stock camming the stock advanced into the pusher into axial alignment with the pusher and into registration with said pad portions to complementarily interfit with the pusher at the location of said pad portions.

References Cited in the file of this patent

UNITED STATES PATENTS

| | | |
|---|---|---|
| 1,449,505 | Fancher et al. | Mar. 27, 1923 |
| 1,597,404 | Crossley | Aug. 24, 1926 |